United States Patent
Nakagawa

(10) Patent No.: US 10,836,214 B2
(45) Date of Patent: Nov. 17, 2020

(54) PNEUMATIC MOTORCYCLE TIRE

(71) Applicant: BRIDGESTONE CORPORATION, Tokyo (JP)

(72) Inventor: Hidemitsu Nakagawa, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 188 days.

(21) Appl. No.: 14/377,912

(22) PCT Filed: Feb. 6, 2013

(86) PCT No.: PCT/JP2013/052688
§ 371 (c)(1),
(2) Date: Aug. 11, 2014

(87) PCT Pub. No.: WO2013/121945
PCT Pub. Date: Aug. 22, 2013

(65) Prior Publication Data
US 2014/0360637 A1  Dec. 11, 2014

(30) Foreign Application Priority Data

Feb. 13, 2012 (JP) .................................. 2012-028548

(51) Int. Cl.
*B60C 11/03* (2006.01)
*B60C 11/117* (2006.01)
*B60C 11/12* (2006.01)

(52) U.S. Cl.
CPC ........ *B60C 11/0302* (2013.01); *B60C 11/032* (2013.01); *B60C 11/0304* (2013.01);
(Continued)

(58) Field of Classification Search
CPC .............. B60C 11/032; B60C 11/0304; B60C 2011/0376; B60C 11/0302
See application file for complete search history.

(56) References Cited

U.S. PATENT DOCUMENTS

D346,351 S * 4/1994 Suzuki .......................... D12/535
D637,139 S * 5/2011 Nakamura ..................... D12/535
(Continued)

FOREIGN PATENT DOCUMENTS

CN 1331637 A 1/2002
CN 101767515 A 7/2010
(Continued)

OTHER PUBLICATIONS

Machine translation for Japan 2007-045367 (no date).*
(Continued)

*Primary Examiner* — Steven D Maki
(74) *Attorney, Agent, or Firm* — Sughrue Mion, PLLC

(57) ABSTRACT

Provided is a pneumatic motorcycle tire in which, without compromising the stability during running, other performances such as light-weight are improved. Provided is a pneumatic motorcycle tire which comprises a tread portion 1, and side wall portions 2 and bead portions 3 extending from both sides of the tread portion, and whose rotation direction when the tire is mounted on a vehicle is designated. A tire tread is provided with a bent main groove composed of: a first groove 11 extending toward the designated tire rotation direction inclined outside in the tread width direction in a contact region during straight running; a second groove 12 extending from the end portion of the first groove in the reverse rotation direction of the designated tire rotation direction toward the reverse rotation direction of the designated tire rotation direction inclined outside in the tire width direction; and a third groove 13 extending from the end portion of the second groove in the reverse rotation direction of the designated tire rotation direction toward the reverse rotation direction of the designated tire rotation direction inclined outside in the tire width direction, and the bent main groove is formed such that an inclination angle $\theta_3$ (Continued)

with respect to the tire circumferential direction of the third groove is larger than an inclination angle $\theta_2$ with respect to the tire circumferential direction of the second groove.

20 Claims, 1 Drawing Sheet

(52) U.S. Cl.
CPC ....... B60C 11/12 (2013.01); *B60C 2011/0376* (2013.01); *B60C 2011/0381* (2013.01); *B60C 2200/10* (2013.01)

(56) References Cited

U.S. PATENT DOCUMENTS

| 2002/0000278 | A1 | | 1/2002 | Cesarini et al. |
| 2010/0200132 | A1 | * | 8/2010 | Funahara ........... B29D 30/1628 152/209.5 |

FOREIGN PATENT DOCUMENTS

| DE | 3411667 | A1 | * | 11/1984 |
| EP | 2202097 | A2 | | 6/2010 |
| GB | 2114069 | A | * | 8/1983 |
| JP | 63-116907 | A | * | 5/1988 |
| JP | 05-201207 | A | * | 8/1993 |
| JP | 11-291715 | A | | 10/1999 |
| JP | 2007-45367 | A | | 2/2007 |
| JP | 2007-045367 | A | * | 2/2007 |
| JP | 2011-046260 | A | * | 3/2011 |
| JP | 2011-46260 | A | | 3/2011 |
| JP | 2011-189805 | A | * | 9/2011 |
| JP | 2011-189805 | A | | 9/2011 |
| JP | 2011-225148 | A | | 11/2011 |
| JP | 1441963 | S | * | 5/2012 |
| WO | 2011/041859 | A1 | | 4/2011 |
| WO | WO-2011-041859 | A1 | * | 4/2011 |

OTHER PUBLICATIONS

Machine translation for Japan 2011-046260 (no date).*
Machine translation for German 3,411,667 (no date).*
Machine translation for Japan 2011-189805 (no date).*
705 Series Aventure Touring, shinkotireusa.com, three pages, Jun. 11, 2017.*
705 Series Dual Sport Tire, shinkotireusa.com, one page, Mar. 28, 2009.*
"Can I use a motorcycle tire made for the front on the rear of my bike?", answers.yahoo.com, two pages, Mar. 2, 2010.*
FAQs "Can I fit a front tire on the rear and a rear on the front?", avon-tyres.co.uk, two pages, Sep. 15, 2017.*
Translation for Japan 63-116907 (Year: 2018).*
Machine translation for Japan 05-201207 (Year: 2019).*
Communication dated Oct. 28, 2015 from the European Patent Office in counterpart application No. 13748565.2.
Communication dated Feb. 3, 2016 from the State Intellectual Property Office of the P.R.C. in counterpart application No. 201380008988.X.
International Search Report for PCT/JP2013/052688 dated Mar. 26, 2013.
Dunlop, "Technische Informationen zur Ausrüstung von Motorrädern and Rollern", Jul. 2006, XP055316130 (total 73 pages).
XP055316145, Mar. 11, 2016, 120-70-17-Dunlop-Sportmax-II-D204. jpg. (total 1 page).
Communication dated Nov. 9, 2016 from the European Patent Office in counterpart Application No. 13 748 565.2.

* cited by examiner

PNEUMATIC MOTORCYCLE TIRE

TECHNICAL FIELD

The present invention relates to a pneumatic motorcycle tire (hereinafter, also simply referred to as "tire"), and particularly, to a pneumatic motorcycle tire in which an arrangement condition of a groove which is formed on the surface of a tread portion is improved.

BACKGROUND ART

When the rigidity of a rear tire of a motorcycle, among others, a motorcycle for touring is reduced for weight reduction or improvement of the riding quality, deflection of the body of the motorcycle is induced by a disturbance input due to unevenness of a road surface, whereby the stability of the running motorcycle has been likely to be inhibited.

As a technique relating to improvement of a pneumatic motorcycle tire, for example, Patent Document 1 discloses a technique of a pneumatic motorcycle tire whose rotation direction when mounted on a vehicle is designated, wherein a bent main groove composed of: a first groove extending toward a designated tire rotation direction inclined outside in the tread width direction in a contact region during straight running of a tread surface; and a second groove extending obliquely outside in the tread width direction from the end portion in the reverse rotation direction of a designated tire rotation direction of the first groove is provided, and the inclination angle of the first groove is defined as a predetermined angle. This technique is aimed at providing a pneumatic motorcycle tire in which both a grip performance with which secure and sporty running can be performed on a circuit or the like and a wet performance with which a secure running can be performed even on a public road are attained.

RELATED ART DOCUMENT

Patent Document

Patent Document 1: Japanese Unexamined Patent Application Publication No. 2011-189805 (CLAIMS and the like)

SUMMARY OF THE INVENTION

Problems to be Solved by the Invention

As mentioned above, in a rear tire for motorcycle, when the light-weight or riding quality is improved by reducing the rigidity, the stability during running may be compromised. In particular, in a motorcycle for touring, since the stability during running is emphasized, this problem has been demanded to be resolved.

Accordingly, an object of the present invention is to solve the above-described problem, and to provide a pneumatic motorcycle tire in which, without compromising the stability during running, other performances such as light-weight are improved.

Means for Solving the Problems

The present inventor intensively studied to find that, by enhancing running performances including the stability by improving not the structure of a tire but the pattern structure on the surface of a tread portion of the tire, both the running performances and light-weight or the like can be attained, thereby completing the present invention.

Specifically, the present invention is a pneumatic motorcycle tire which comprises a tread portion, and side wall portions and bead portions extending from both sides of the tread portion, and whose rotation direction when the tire is mounted on a vehicle is designated, wherein a tire tread is provided with a bent main groove composed of: a first groove extending toward the designated tire rotation direction inclined outside in the tire width direction in a contact region during straight running; a second groove extending from the end portion of the first groove in the reverse rotation direction of the designated tire rotation direction toward the reverse rotation direction of the designated tire rotation direction inclined outside in the tire width direction; and a third groove extending from the end portion of the second groove in the reverse rotation direction of the designated tire rotation direction toward the reverse rotation direction of the designated tire rotation direction inclined outside in the tire width direction, and the bent main groove is formed such that an inclination angle $\theta_3$ with respect to the tire circumferential direction of the third groove is larger than an inclination angle $\theta_2$ with respect to the tire circumferential direction of the second groove.

In the present invention, preferably, a groove width $w_A$ of the first groove is larger than a groove width $w_B$ of the second groove, and the range represented by the following expression:

$$1 \leq w_A/w_B \leq 2$$

is satisfied. Suitably, there are no grooves other than the second groove in a region from the end portion outside in the tire width direction of the first groove to the end portion outside in the tire width direction of the second groove.

Further, in the present invention, an inclination angle $\theta_1$ with respect to the tire circumferential direction of the first groove is from 15° to 40°, an inclination angle $\theta_2$ with respect to the tire circumferential direction of the second groove is from 15° to 40°, and an inclination angle $\theta_3$ with respect to the tire circumferential direction of the third groove is from 50° to 80°. Still further, letting the tread width be TW, and the distance from the tire equator plane to the end portion outside in the tire width direction of the first groove be $W_1$, the following expression:

$$0.05 \leq W_1/TW \leq 0.2$$

is preferably satisfied. Still further, letting the tread width be TW, and the distance from the tire equator plane to the end portion outside in the tire width direction of the second groove be $W_2$, the following expression:

$$0.1 \leq W_2/TW \leq 0.3$$

is preferably satisfied.

Effects of the Invention

According to the present invention, by employing the above-described constitution, a pneumatic motorcycle tire in which, without compromising the stability during running, other performances such as light-weight are improved.

MODE FOR CARRYING OUT THE INVENTION

In the following, an embodiment of the present invention will be described in detail with reference to the Drawings.

Figure 1:
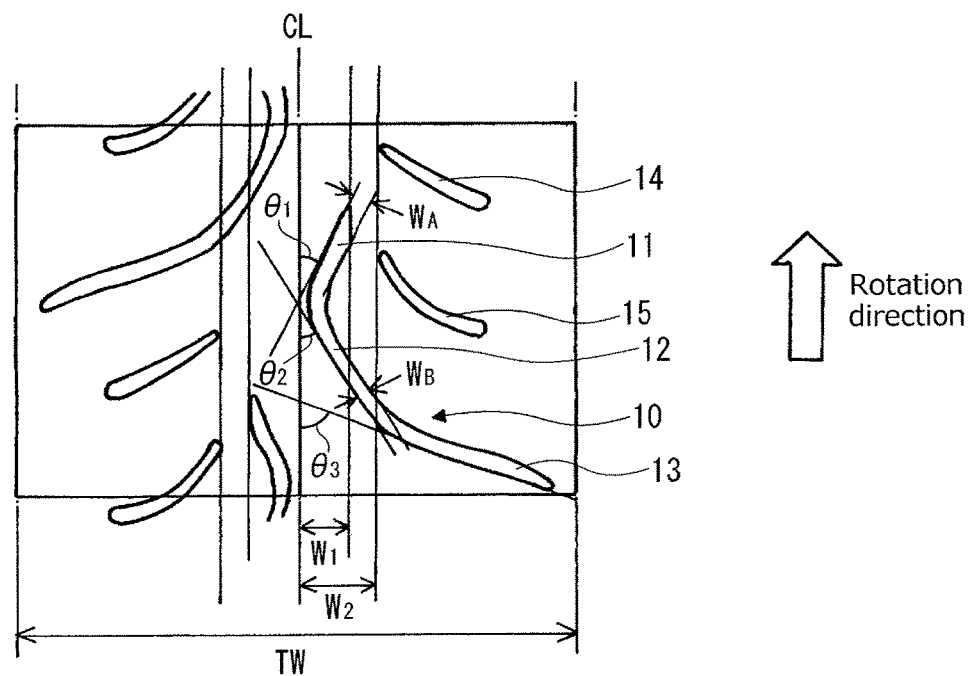
FIG. 1 is a partial development view illustrating a tread of one example of a pneumatic motorcycle tire of the present invention.
Figure 2:
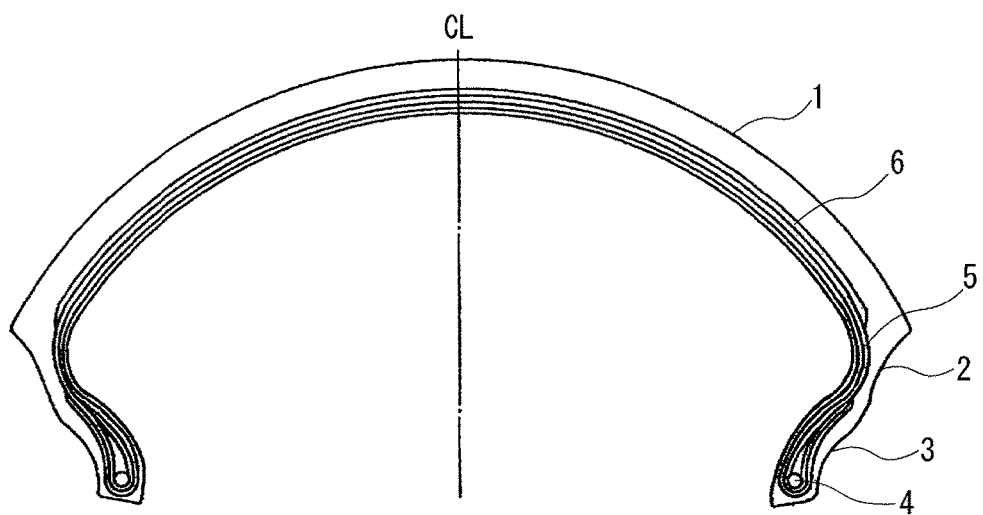
FIG. 2 is a schematic cross section illustrating one example of a pneumatic motorcycle tire of the present invention.

FIG. 1 is a partial development view illustrating a tread of one example of a pneumatic motorcycle tire of the present invention. FIG. 2 is a schematic cross section illustrating one example of a pneumatic motorcycle tire of the present invention. As illustrated in FIGS. 1, 2, the pneumatic motorcycle tire of the present invention comprises a tread portion 1, and side wall portion 2 and bead portion 3 extending from both sides of the tread portion, and is one having a so-called directional pattern in which the rotation direction when mounted on a vehicle is designated. An arrow sign in FIG. 1 represents the rotation direction (designated rotation direction) when the tire is mounted on a vehicle.

Here, from the viewpoint of the pattern structure of a tire tread, in order to enhance the running performance, it is effective to arrange a groove in a direction along an input generated on a tire tread during running for efficiently utilizing a grip force generated on the surface of a tire during rolling. Since a driving wheel is at the rear of a motorcycle, a traction is generated on the rear tire when traveling straight and a lateral force is generated on the rear tire when turning; therefore, it is important to effectively arrange a groove in response to both the inputs. It is thus thought that it is effective to arrange a lug groove on a tread center portion in a direction approximately to the tire circumferential direction and to arrange on a tread shoulder portion a lug groove inclined in a direction approximately to the tire width direction.

From such a viewpoint, in the present invention, as illustrated in FIG. 1, a tire tread is provided with a main groove 10 including two bending portions. Such a main groove 10 is composed of: a first groove 11 extending toward the designated tire rotation direction inclined outside in the tire width direction in a contact region during straight running; a second groove 12 extending from the end portion of the first groove 11 in the reverse rotation direction of the designated tire rotation direction toward the reverse rotation direction of the designated tire rotation direction inclined outside in the tire width direction; and a third groove 13 extending from the end portion of the second groove 12 in the reverse rotation direction of the designated tire rotation direction toward the reverse rotation direction of the designated tire rotation direction inclined outside in the tire width direction. The main grooves 10 are arranged at a predetermined interval in the tire circumferential direction alternately on one side and the other side of the surface of a tread portion bridging a tire equator plane CL such that they are at least overlapped when projected in the tire width direction, to form a pattern. In the drawing, both ends of the contact region in the tire width direction during straight running are each positioned at the middle point between the end portion outside in the tire width direction of the first groove 11 having a distance $W_1$ from the tire equator plane and the end portion outside in the tire width direction of the second groove 12 having a distance $W_2$ from the tire equator plane CL.

Further, in the present invention, the main groove is formed such that an inclination angle $\theta_3$ with respect to the tire circumferential direction of the third groove 13 is larger than an inclination angle $\theta_2$ with respect to the tire circumferential direction of the second groove 12. Specifically, in the present invention, the main groove 10 forms approximately an C-shape (or approximately an inversed C-shape) as a whole. Here, in the present invention, each of the inclination angles $\theta_1$, $\theta_3$ of the first, third grooves 11, 13 with respect to the tire circumferential direction is an angle formed by a line connecting the terminal position of each groove and the center position of the bending point in the groove width, and the tire circumferential direction. The inclination angle $\theta_2$ of the second groove 12 with respect to the tire circumferential direction is an angle formed by a line connecting between the center positions of bending points in the groove width, and the tire circumferential direction. In the present invention, the groove width of each groove means a groove width measured along the direction orthogonal to the direction along the groove.

In the present invention, by providing such a main groove 10, the following effects can be obtained. Specifically, regarding a tread center portion in the vicinity of the contact region during straight running, by arranging the first groove 11 and second groove 12 bending toward the inside of the tire, a ground contact area is increased by appropriately reducing the off-plane flexural rigidity to improve the grounding property, thereby enhancing the endurance against a disturbance input. By setting the inclination angles of the first groove 11 and second groove 12 relatively small, an input generated on a tread in a front-rear direction at the time of driving is not inhibited, thereby sufficiently securing a drainability.

On the other hand, regarding a tread shoulder portion on the outside in the tire width direction, the third groove 13 whose inclination angle with respect to the tire circumferential direction is larger than that of the second groove 12 is arranged. In other words, by arranging, in a contact region during turning of a vehicle, the third groove 13 whose inclination angle is closer to the tire width direction following an input during turning, deformation of a land portion due to an external force during turning of a vehicle is restrained and a ground contact surface is secured, thereby improving the running performance to a lateral force. From a similar reason to that of the tread center portion, the drainability in this region can be improved. When a groove which is on the same extended line of the groove arranged on the tread center portion is arranged on the tread shoulder portion, the direction of the groove does not follow the lateral force, and therefore a desired grip performance is not obtained.

Therefore, according to the present invention, a pneumatic motorcycle tire in which grip performance, wet performance, or the like can be improved while securing stability during running without compromising light-weight since change of the structure of a tire is not involved, and safe running is made possible on a variety of road surfaces can be attained.

As used herein, the term "contact region during straight running" refers to a region which is a ground contact surface of a tire when a tire is subjected to a straight running under a prescribed load in a state in which the tire is mounted on a rim which is defined by an industrial standard which is effective in a region where the tire is produced and to be used and in which the tire is inflated to an inner pressure defined in the industrial standard. The above-mentioned industrial standard corresponds to JATMA (Japan Automobile Tyre Manufacturers Association, Inc.) YEAR BOOK in Japan, corresponds to ETRTO (European Tyre and Rim Technical Organisation) STANDARD MANUAL in Europe, corresponds to TRA (THE TIRE and RIM ASSOCIATION INC.)

YEARBOOK in the United States, and so on. Further, the "designated tire rotation direction" refers to a direction which is designated to the rotation direction of a tire when the tire is mounted on a vehicle, which is the direction of the arrow in FIG. 1. On the other hand, the "reverse rotation direction" refers to a backward direction when the designated tire rotation direction is set to a forward direction.

Further, herein, the sentence "first groove extends in a contact region during straight running" means that 70% or larger of the groove area of the first groove 11 is in the contact region during straight running. Part of the first groove 11 may be arranged extending to a contact region on the outside of the contact region during straight running in the tire diameter direction. 80% or larger of the groove area of the second groove can be arranged in the contact region during straight running, and part of the second groove may be arranged extending to a contact region on the outside of the contact region in the tire diameter direction.

In order to improve the grounding property while inhibiting as little as possible an input by a driving force, the inclination angles $\theta_1$ and $\theta_2$ of the first groove 11 and second groove 12 with respect to the tire circumferential direction are preferably set to the following ranges. That is, the inclination angle $\theta_1$ is suitably from 15° to 40°, and the inclination angle $\theta_2$ is suitably from 15° to 40°. When the inclination angle is smaller than the above-described range, an effect of improving the stability due to the improvement of the grounding property is small. On the other hand, when the angle is larger than the above-described range, deterioration of grip performance is notable since an input by driving force is inhibited. Since the inclination angle $\theta_1$ is preferably set to 35° or smaller since, when the angle is above 35°, deterioration of wet performance due to deterioration of drainability is notable.

Further, the third groove 13 which is arranged on the tread shoulder side is preferably in a direction following a lateral force, and the inclination angle $\theta_3$ of the groove with respect to the tire circumferential direction is preferably from 50° to 80°. When the inclination angle $\theta_3$ is smaller than the above-described range, grip performance is deteriorated since an input is inhibited. On the other hand, when the angle is larger than the above-described range, deterioration of wet performance due to deterioration of drainability is notable.

Although, in an example illustrated in FIG. 1, the first groove 11, second groove 12, and third groove 13 are connected together to form a continuous main groove 10, in the present invention, the main groove 10 formed by these three grooves 11 to 13 may be interrupted at least at one portion. Here, in cases in which the main groove 10 is formed in a shape which is interrupted at least at one portion, the interrupted portion is preferably provided on the third groove 13 portion. This is because, since the first groove 11 and second groove 12 portions are frequently used during running on a wet road surface, deterioration of wet performance is notable when drainability is inhibited due to the existence of an interrupted portion at these portions. Here, the connecting portions of the first to third grooves are preferably formed in a curved shape as illustrated in the drawing. In the case of the continuous main groove 10 which is formed by connecting the first groove 11, second groove 12, and third groove 13 together, the drainability is improved since the main groove 10 is continuous as a drainage route, and as the result, the wet performance of a tire is improved.

In the present invention, in order to improve the grounding property and stability, the groove width $w_A$ of the first groove 11 is preferably set a little larger than the groove width $w_B$ of the second groove 12, and specifically, is preferably set such that the range represented by the following expression:

$$1 \leq w_A/w_B \leq 2$$

is satisfied. When the ratio $w_A/w_B$ is above 2, an influence of deterioration of grip performance due to deterioration of rigidity is notable.

In the tread center portion where the largest input is generated, an appropriate pattern rigidity is also needed to be secured at the same time, the main groove 10 according to the present invention is preferably arranged separated from the tire equator plane CL. This also means that, in the present invention, there preferably is no circumferential direction groove extending in the tire circumferential direction on the tire equator. The first groove 11 is preferably arranged in a range satisfying the following expression:

$$0.05 \leq W_1/TW \leq 0.2,$$

letting the tread width be TW, and the distance from the tire equator plane to the outside end portion of the first groove 11 in the tire width direction be $W_1$. When the ratio $W_1/TW$ is below 0.05, the effect of improving the stability due to the improvement of grounding property is small. On the other hand, when the ratio is above 0.2, deterioration of grip performance due to deterioration of the rigidity is notable.

On the other hand, since it is effective that the third groove 13 is arranged in a region where the tire is in contact with ground when turning, the connecting portion of the second groove 12 and third groove 13 is preferably set in the following range. Specifically, letting the tread width be TW, and the distance from the tire equator plane CL to the outside end portion of the second groove 12 in the tire width direction be $W_2$, the following expression:

$$0.1 \leq W_2/TW \leq 0.3$$

is satisfied. When the ratio $W_2/TW$ is below 0.1, grip performance during straight running deteriorates; when the ratio is larger than 0.3, grip performance during turning deteriorates.

In the present invention, an auxiliary groove other than the main groove 10 can be appropriately arranged. In the illustrated example, auxiliary grooves 14, 15 are arranged outside, in the tire width direction, from the end portion of the second groove 12 in the reverse rotation direction of the designated tire rotation direction.

Here, in order to improve endurance to a disturbance input, auxiliary grooves 14, 15 other than the main groove 10 which are arranged to secure wet performance are preferably arranged separated from the tire equator plane by a distance at least 0.14 times the tread width TW. When the positions of the auxiliary grooves 14, 15 are in a range of less than 0.14 times the tread width TW from the tire equator plane, the lateral rigidity deteriorates causing deterioration of the stability. This in turns means that there is no groove other than the second groove 12 in a region from the outside end portion of the first groove 11 in the tire width direction to the outside end portion of the second groove 12 in the tire width direction.

In the present invention, the arrangement pitch of the main grooves 10, in particular, of the main grooves 10 and auxiliary grooves is not particularly restricted, and may be approximately 1/11 to 1/13 of the total circumferential length of a tire. In the present invention, the positions of the main groove 10, in particular, the main groove 10 and auxiliary grooves in the tire circumferential direction are arranged on the surface of the tread portion alternately on one side and the other side across the tire equator plane CL, or arranged shifted by ½ of the arrangement pitch.

In the present invention, only that the above-described conditions relating to a tread pattern are satisfied is important, and by this, an expected effect of the present invention can be obtained. Other details such as the tire structure and material of each member are not particularly restricted.

For example, a tire of the present invention comprises: a carcass 5 which is arranged bridging between a pair of bead cores 4 each embedded in bead portion 3 and reinforces each portions; and a belt 6 which is arranged on the outer periphery thereof and reinforces the tread portion 1. Such a belt 6 may be composed of two or more inclined belt layers which are arranged such that cord directions are crossed with each other between the layers, or may be composed of one or more spiral belt layers in which the cord direction is substantially in the tire circumferential direction. The present invention is useful for a rear tire for motorcycle, and can be applied to either a radial structure tire or a bias structure tire.

EXAMPLES

In the following, the present invention will be described in more detail by way of Examples.

In accordance with the conditions listed on the Table below, a rear tire for motorcycle having a tire size of MCR180/55ZR17M/C with a directional pattern of a type illustrated in FIG. 1 was manufactured by changing the values of inclination angle, $W_1/TW$, $W_2/TW$ and $w_A/w_B$ of first to third grooves. Regarding a belt, a spiral belt layer whose cord direction is substantially in the tire circumferential direction was arranged as one layer.

Each obtained test tire was mounted on a large-size motorcycle of 1250 cc, and the running stability, grip performance and wet performance were evaluated by feeling evaluation in a real vehicle test. As a front tire, a commercially available tire with a size of MCR120/70ZR17M/C was used. The results were indicated as indices taking 100 as a normal level. For each item, when the value is large, the performance is high, which is preferable. For each performance, a point within ±3 was regarded to be in a tolerance range (in a similar level). The results are listed on the Table below in combination.

the second groove, the stability, grip performance, and wet performance are all balanced, and favorable performance was confirmed to be obtained.

The results in the above Table shows that, in Example 3 in which the inclination angle of the first groove is small, the stability tends to be low and shows that, in Example 4 in which the inclination angle of the first groove is large, grip performance and wet performance tend to be deteriorated. Further, it is shown that, also in Example 6 in which the value of $W_2/TW$ is small and in Example 8 in which the value of $w_A/w_B$ is large, grip performance and wet performance tend to be deteriorated.

DESCRIPTION OF SYMBOLS

1 Tread portion
2 Side wall portion
3 Bead portion
4 Bead core
5 Carcass
6 Belt
10 Main groove
11 First groove
12 Second groove
13 Third groove
14, 15 Auxiliary groove

The invention claimed is:
1. A pneumatic motorcycle tire which comprises a tread portion, side wall portions, and bead portions extending from both sides of the tread portion, and includes a tire equator plane, a tread width, and a designated rotation direction of the tire when the tire is mounted on a vehicle, wherein the tread portion is provided with a plurality of bent main grooves, each bent main groove comprising:
a first groove extending toward the designated tire rotation direction inclined outside in a tire width direction in a contact region during straight running;
a second groove extending from a proximal end portion of the first groove in a reverse rotation direction of the designated tire rotation direction inclined outside in the tire width direction; and

TABLE 1

|  | Inclination angle θ₁ of first groove | Inclination angle θ₂ of second groove | Inclination angle θ₃ of third groove | $W_1/TW$ | $W_2/TW$ | $w_A/w_B$ | Stability (index) | Grip performance (index) | Wet performance (index) |
|---|---|---|---|---|---|---|---|---|---|
| Example 1 | 26 | 27 | 70 | 0.1 | 0.15 | 1.6 | 110 | 110 | 105 |
| Example 2 | 16 | 27 | 70 | 0.1 | 0.15 | 1.6 | 105 | 107 | 107 |
| Example 3 | 12 | 27 | 70 | 0.1 | 0.15 | 1.6 | 97 | 105 | 108 |
| Example 4 | 38 | 27 | 70 | 0.1 | 0.15 | 1.6 | 109 | 98 | 97 |
| Example 5 | 26 | 27 | 70 | 0.1 | 0.1 | 1.6 | 108 | 105 | 103 |
| Example 6 | 26 | 27 | 70 | 0.1 | 0.05 | 1.6 | 106 | 98 | 98 |
| Example 7 | 26 | 27 | 70 | 0.1 | 0.15 | 1.2 | 107 | 108 | 106 |
| Example 8 | 26 | 27 | 70 | 0.1 | 0.15 | 2.5 | 111 | 97 | 97 |
| Example 9 | 26 | 35 | 70 | 0.1 | 0.15 | 1.6 | 112 | 102 | 98 |
| Example 10 | 26 | 27 | 85 | 0.1 | 0.15 | 1.6 | 110 | 112 | 97 |
| Example 11 | 26 | 27 | 70 | 0.15 | 0.3 | 1.6 | 112 | 98 | 97 |
| Comparative Example | 26 | 50 | 50 | 0.1 | 0.15 | 1.6 | 105 | 92 | 95 |

As listed on the above Table, for each tire of the Examples in which a tire tread is provided with a bent main groove composed of first to third grooves, and the inclination angle of the third groove is set larger than the inclination angle of a third groove extending from a distal end portion of the second groove in the reverse rotation direction of the designated tire rotation direction inclined outside in the tire width direction, wherein each bent main groove is formed such that an inclination angle $\theta_3$ with respect to a tire circumferential direction of the third groove is larger than an inclination angle $\theta_2$ with respect to the tire circumferential direction of the second groove, and wherein the tread portion is provided with a plurality of auxiliary grooves with two auxiliary grooves provided for each and every bent main groove, and the plurality of auxiliary grooves are arranged outside, in the tire width direction, from the end portion of the second groove in the reverse rotation direction of the designated tire rotation direction.

2. The pneumatic motorcycle tire according to claim 1, wherein an inclination angle $\theta_1$ with respect to the tire circumferential direction of the first groove is from 15° to 40°, the inclination angle $\theta_2$ with respect to the tire circumferential direction of the second groove is from 15° to 40°, and the inclination angle $\theta_3$ with respect to the tire circumferential direction of the third groove is from 50° to 80°.

3. The pneumatic motorcycle tire according to claim 1, wherein each auxiliary groove is shorter in length than each bent main groove in the tire circumferential direction.

4. The pneumatic motorcycle tire according to claim 1, wherein no circumferential grooves are disposed on the tread portion.

5. A pneumatic motorcycle tire which comprises a tread portion, side wall portions, and bead portions extending from both sides of the tread portion, and includes a tire equator plane, a tread width, and a designated rotation direction of the tire when the tire is mounted on a vehicle, wherein the tread portion is provided with a plurality of bent main grooves, each bent main groove comprising:
  a first groove extending toward the designated tire rotation direction inclined outside in a tire width direction in a contact region during straight running;
  a second groove extending from a proximal end portion of the first groove in a reverse rotation direction of the designated tire rotation direction inclined outside in the tire width direction; and
  a third groove extending from a distal end portion of the second groove in the reverse rotation direction of the designated tire rotation direction inclined outside in the tire width direction, and wherein each bent main groove is formed such that an inclination angle $\theta_3$ with respect to a tire circumferential direction of the third groove is larger than an inclination angle $\theta_2$ with respect to the tire circumferential direction of the second groove, wherein both ends of the contact region in the tire width direction during straight running are each positioned at a middle point between a distal end portion of the first groove in the tire width direction, and the distal end portion of the second groove in the tire width direction, wherein at least a portion of the second groove is located within the contact region, and wherein the tread portion is provided with a plurality of auxiliary grooves with two auxiliary grooves provided for each and every bent main groove, and the plurality of auxiliary grooves are arranged outside, in the tire width direction, from the end portion of the second groove in the reverse rotation direction of the designated tire rotation direction.

6. The pneumatic motorcycle tire according to claim 5, wherein a groove width $w_A$ of the first groove is larger than a groove width $w_B$ of the second groove, and a range represented by the following expression:

$$1 < w_A/w_B \leq 2$$

is satisfied.

7. The pneumatic motorcycle tire according to claim 5, wherein there are no grooves other than the second groove in a region from the distal end portion outside in the tire width direction of the first groove to the distal end portion outside in the tire width direction of the second groove.

8. The pneumatic motorcycle tire according to claim 5, wherein an inclination angle $\theta_1$ with respect to the tire circumferential direction of the first groove is from 15° to 40°, the inclination angle $\theta_2$ with respect to the tire circumferential direction of the second groove is from 15° to 40°, and the inclination angle $\theta_3$ with respect to the tire circumferential direction of the third groove is from 50° to 80°.

9. The pneumatic motorcycle tire according to claim 5, wherein,
letting the tread width be TW, and a distance from a tire equator plane to the distal end portion outside in the tire width direction of the first groove be $W_1$, the following expression:

$$0.05 \leq W_1/TW \leq 0.2$$

is satisfied.

10. The pneumatic motorcycle tire according to claim 5, wherein,
letting the tread width be TW, and a distance from a tire equator plane to the distal end portion outside in the tire width direction of the second groove be $W_2$, the following expression:

$$0.1 \leq W_2/TW \leq 0.3$$

is satisfied.

11. The pneumatic motorcycle tire according to claim 5, wherein the auxiliary grooves are located on both sides of each bent main groove in the tire width direction.

12. The pneumatic motorcycle tire according to claim 5, wherein the first groove has an inclination angle $\theta_1$ with respect to the tire circumferential direction, and
the following expression is satisfied:

$$\theta_1 < \theta_2 < \theta_3.$$

13. The pneumatic motorcycle tire according to claim 5, wherein the tire has a tire size of MCR 180/55ZR17 M/C.

14. The pneumatic motorcycle tire according to claim 5, wherein each auxiliary groove is shorter in length than each bent main groove in the tire circumferential direction.

15. The pneumatic motorcycle tire according to claim 5, wherein no circumferential grooves are disposed on the tread portion.

16. A motorcycle comprising:
a front wheel motorcycle tire;
a rear wheel pneumatic motorcycle tire which comprises a tread portion, side wall portions, and bead portions extending from both sides of the tread portion, and includes a tire equator plane, a tread width, and a designated rotation direction of the tire when the tire is mounted on a vehicle, wherein
the tread portion is provided with a plurality of bent main grooves, each bent main groove comprising:
  a first groove extending toward the designated tire rotation direction inclined outside in a tire width direction in a contact region during straight running;

a second groove extending from a proximal end portion of the first groove in a reverse rotation direction of the designated tire rotation direction inclined outside in the tire width direction; and a third groove extending from a distal end portion of the second groove in the reverse rotation direction of the designated tire rotation direction inclined outside in the tire width direction, wherein each bent main groove is formed such that an inclination angle $\theta_3$ with respect to a tire circumferential direction of the third groove is larger than an inclination angle $\theta_2$ with respect to the tire circumferential direction of the second groove, and wherein the tread portion is provided with a plurality of auxiliary grooves with two auxiliary grooves provided for each and every bent main groove, and the plurality of auxiliary grooves are arranged outside, in the tire width direction, from the end portion of the second groove in the reverse rotation direction of the designated tire rotation direction.

17. The motorcycle according to claim 16, wherein an inclination angle $\theta_1$ with respect to the tire circumferential direction of the first groove is from 15° to 40°, the inclination angle $\theta_2$ with respect to the tire circumferential direction of the second groove is from 15° to 40°, and the inclination angle $\theta_3$ with respect to the tire circumferential direction of the third groove is from 50° to 80°.

18. The motorcycle according to claim 16, wherein the two auxiliary grooves are separated from the tire equator plane by a distance at least 0.14 times the tread width.

19. The motorcycle according to claim 16, wherein each auxiliary groove is shorter in length than each bent main groove in the tire circumferential direction.

20. The motorcycle according to claim 16, wherein no circumferential grooves are disposed on the tread portion.

* * * * *